United States Patent
Gill

(10) Patent No.: US 7,511,926 B2
(45) Date of Patent: Mar. 31, 2009

(54) LARGER DR CPP GMR STRUCTURE

(75) Inventor: Hardayal Singh Gill, Palo Alto, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 924 days.

(21) Appl. No.: 10/867,521

(22) Filed: Jun. 14, 2004

(65) Prior Publication Data

US 2006/0002033 A1   Jan. 5, 2006

(51) Int. Cl.
*G11B 5/39* (2006.01)

(52) U.S. Cl. .................... 360/314; 360/324.11

(58) Field of Classification Search ............ 360/314, 360/324, 324.1, 324.11, 324.12, 324.2
See application file for complete search history.

(56) References Cited

U.S. PATENT DOCUMENTS

| | | | |
|---|---|---|---|
| 5,442,508 A | 8/1995 | Smith | 360/113 |
| 5,583,725 A * | 12/1996 | Coffey et al. | 360/324.11 |
| 6,822,838 B2 * | 11/2004 | Lin et al. | 360/324.2 |
| 7,161,771 B2 * | 1/2007 | Lin et al. | 360/314 |
| 2002/0097538 A1 | 7/2002 | Seyama et al. | 360/324.12 |
| 2002/0191348 A1 | 12/2002 | Hasegawa et al. | 360/314 |
| 2003/0123198 A1 | 7/2003 | Sugawara et al. | 360/314 |
| 2003/0143431 A1 | 7/2003 | Hasegawa | 428/692 |
| 2003/0179516 A1 | 9/2003 | Freitag et al. | 360/324.11 |
| 2003/0184918 A1 | 10/2003 | Lin et al. | 360/314 |
| 2003/0184919 A1 * | 10/2003 | Lin et al. | 360/314 |
| 2003/0206381 A1 * | 11/2003 | Hou et al. | 360/324.11 |
| 2003/0227721 A1 | 12/2003 | Gill | 360/314 |
| 2003/0227722 A1 | 12/2003 | Freitag et al. | 360/324.11 |
| 2004/0008450 A1 | 1/2004 | Gill | 360/314 |
| 2004/0057162 A1 | 3/2004 | Gill | 360/314 |
| 2004/0075953 A1 * | 4/2004 | Gill | 360/314 |
| 2004/0085683 A1 * | 5/2004 | Lin et al. | 360/314 |
| 2004/0114280 A1 * | 6/2004 | Yoshikawa et al. | 360/314 |

FOREIGN PATENT DOCUMENTS

| | | | |
|---|---|---|---|
| JP | 2002150511 A | * | 5/2002 |
| JP | 2003008100 A | * | 1/2003 |
| JP | 2004103730 A | * | 4/2004 |

OTHER PUBLICATIONS

IBM Technical Disclosure Bulletin, "Spin Valve Head with Series Connected Current-Perpendicular-to-Plane Type Elements," Apr. 1997.
IPCOM13305D, "Double Dual GMR Head," Jun. 18, 2003.

* cited by examiner

*Primary Examiner*—William J Klimowicz
(74) *Attorney, Agent, or Firm*—Zilka-Kotab, PC

(57) ABSTRACT

A current perpendicular to plane (CPP) giant magnetoresistive (GMR) sensor having two dual spin valves sharing a common self pinned pinned layer.

20 Claims, 3 Drawing Sheets

LARGER DR CPP GMR STRUCTURE

FIELD OF THE INVENTION

The present invention relates to a current perpendicular to plane (CPP) giant magnetoresistive (GMR) sensor and more particularly to a sensor having two dual GMR sensors sharing a common self pinned layer.

BACKGROUND OF THE INVENTION

The heart of a computer is an assembly that is referred to as a magnetic disk drive. The magnetic disk drive includes a rotating magnetic disk, write and read heads that are suspended by a suspension arm adjacent to a surface of a rotating magnetic disk and an actuator that swings the suspension arm to place the read and write heads over selected circular tracks on the rotating disk. The read and write heads are directly located on a slider that has an air bearing surface (ABS). The suspension arm biases the slider into contact with the surface of the disk when the disk is not rotating but, when the disk rotates, air is swirled by the rotating disk. When the slider rides on the air bearing, the write and read heads are employed for writing magnetic impressions to and reading magnetic impressions from the rotating disk. The read and write heads are connected to processing circuitry that operates according to a computer program to implement the writing and reading functions.

The write head includes a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic impressions in tracks on the moving media, such as in circular tracks on the aforementioned rotating disk.

In recent read head designs a spin valve sensor, also referred to as a giant magnetoresistive (GMR) sensor, has been employed for sensing magnetic fields from the rotating magnetic disk. The sensor includes a nonmagnetic conductive layer, hereinafter referred to as a spacer layer, sandwiched between first and second ferromagnetic layers, hereinafter referred to as a pinned layer and a free layer. First and second leads are connected to the spin valve sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to $\cos\theta$, where $\theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

A spin valve sensor is characterized by a magnetoresistive (MR) coefficient that is substantially higher than the MR coefficient of an anisotropic magnetoresistive (AMR) sensor. For this reason a spin valve sensor is sometimes referred to as a giant magnetoresistive (GMR) sensor. When a spin valve sensor employs a single pinned layer it is referred to as a simple spin valve. When a spin valve employs an antiparallel (AP) pinned layer it is referred to as an AP pinned spin valve. An AP spin valve includes first and second magnetic layers separated by a thin non-magnetic coupling layer such as Ru. The thickness of the spacer layer is chosen so as to antiparallel couple the magnetizations of the ferromagnetic layers of the pinned layer. A spin valve is also known as a top or bottom spin valve depending upon whether the pinning layer is at the top (formed after the free layer) or at the bottom (before the free layer).

The spin valve sensor is located between first and second nonmagnetic electrically insulating read gap layers and the first and second read gap layers are located between ferromagnetic first and second shield layers. In a merged magnetic head a single ferromagnetic layer functions as the second shield layer of the read head and as the first pole piece layer of the write head. In a piggyback head the second shield layer and the first pole piece layer are separate layers.

Sensors can also be categorized as current in plane (CIP) sensors or as current perpendicular to plane (CPP) sensors. In a CIP sensor, current flows from one side of the sensor to the other side parallel to the planes of the materials making up the sensor. Conversely, in a CPP sensor the sense current flows from the top of the sensor to the bottom of the sensor perpendicular to the plane of the layers of material making up the sensor. In a CPP sensor design, the magnetic shields usually double as electrical leads for supplying a sense current to the sensor. Therefore, in CPP sensor design, the shields/leads contact the top and bottom of the sensor.

The ever increasing demand for data storage density and data rate have increasingly pushed the limits of data storage designs. Recently in efforts to overcome such limits, engineers and scientists have focused on the use of perpendicular recording. In a perpendicular recording system a write pole emits a highly concentrated magnetic field that is directed perpendicular to the surface of the medium (eg. the disk). This field in turn magnetizes a localized portion of the disk in a direction perpendicular to the surface of the disk, thereby creating a bit of data. The resulting flux travels through the disk to a return path having a much larger area than the area in which the bit was recorded. The increased interest in perpendicular recording has lead to an increased interest in current perpendicular to plane (CPP) sensors, which are particularly suited to use in perpendicular recording.

The ever increasing demands for increase data density and data rate have also led engineers to look at the possibility of constructing dual GMR sensors. Such a sensor would have two free layer/pinned layer interfaces, such as by having a free layer sandwiched between two pinned layers. However, many challenges presented by the use of such a design have prevented dual GMR sensors from being used, and to date no commercial dual GMR sensor has been produced. One problem presented by such a design is that the use of a dual GMR sensor takes up too much gap budget (the thickness of the sensor as measured from one shield to the other). Increased sensor thickness leads to increased bit length, and therefore leads to decreased data density and data rate. A significant contributor to this sensor gap increase has been due to the fact that each pinned layer requires its own antiferromagnetic AFM pinning layer. AFM layers used to pin the magnetic moment of a pinned layer through exchange coupling are very thick, often being significantly thicker than all of the other sensor layers combined. In addition, in a CPP sensor the AFM layer adds additional sheet resisistance (the denominator in the dr/R measurement), thereby decreasing the sensitivity of the sensor. Therefore, the use of multiple AFM layers becomes impractical.

In addition, the use of AFM layers increases to the distance between the spacer layers of each of the pinned layer/spacer layer/free layer interfaces. This causes each interface to read a different part of the magnetic signal, which tends to be a generally bell shaped curve. Reading different parts of signal curve leads to poor signal reading and increased noise, rendering such sensors impractical.

Therefore, there remains a need for a practical sensor that can provide improved dr/R GMR performance needed for future generation memory storage products. Such a sensor would preferably be usable as a current perpendicular to plane sensor, since these are the sensor that will be most attractive for use in future perpendicular recording systems. Such a sensor would preferably minimize the number of AFM pinning layers while maximizing the number of free layer/spacer layer/pinned layer interfaces in order to maximize the dr/R of the sensor. Such a sensor would also preferably minimize the spacing between each of the free layer/spacer layer/pinned layer interfaces so that the sensor will read, as much as possible, only a single portion of the signal curve.

SUMMARY OF THE INVENTION

The present invention provides a current perpendicular to plane (CPP) giant magnetoresistance (GMR) sensor having greatly improved dr/R sensitivity. The sensor includes first, second and third pinned layer structures, the second pinned layer structure being located between the first and third pinned layer structures. The second pinned layer structure is an antiparallel (AP) pinned structure and is self pinned, in that it is not pinned by exchange coupling with a layer of antiferromagnetic (AFM) material. A first free layer structure is located between the first and second pinned layer structures and a second free layer structures separate the second pinned layer structure from the third pinned layer structure.

A first non-magnetic, electrically conductive spacer layer separates first pinned layer from the first free layer and a second spacer layer separates the first free layer from the second pinned layer. Similarly, a third spacer layer separates the second pinned layer from the second free layer and a fourth spacer layer separates the second free layer from the third pinned layer.

Advantageously, the sensor of the present invention provides fourth spacer layers separating the various free and pinned layers, thereby providing twice as many electron spin scattering interfaces as a standard dual GMR and four times as many interfaces as a standard single GMR. This allows the sensor of the present invention to achieve an enormous increase in dr/R.

In addition, since the middle pinned layer structure (the second pinned layer structure) is self pinned, there is no need for the exceedingly thick AFM layer that would otherwise be needed. This allows the spacer various spacer layers to be constructed much closer together, thereby avoiding reading different, spaced apart portions of the magnetic signal simultaneously.

The second pinned layer can include first, second and third magnetic layers separated by first and second non-magnetic AP coupling layers. Providing three magnetic layers in the second pinned layer can allow the orientations of the magnetic moments of the outer layers to point in the same direction, thereby providing additive GMR effect. The magnetic layers can be constructed of a magnetic material having a strong positive magnetostriction, such as for example CoFe. The AP coupling layers can be constructed of for example Ru.

The first and third pinned layers can also be constructed as AP pinned layers and can either be self pinned, or AFM pinned. Alternatively, one of the first and third pinned layers structures could be self pinned and the other could be AFM pinned. The first and third pinned layers can include a pair of magnetic layers, such as CoFe, separated by a non-magnetic, electrically conductive AP coupling layer such as Ru. These and other advantages and aspects of the present invention can be better appreciated upon reading of the following detailed description taken in conjunction with the Figures in which like reference numerals designate like elements throughout the various Figures.

BRIEF DESCRIPTION OF THE DRAWINGS

For a fuller understanding of the nature and advantages of this invention, as well as the preferred mode of use, reference should be made to the following detailed description read in conjunction with the accompanying drawings.

BEST MODE FOR CARRYING OUT THE INVENTION

The following description is of the best embodiments presently contemplated for carrying out this invention. This description is made for the purpose of illustrating the general principles of this invention and is not meant to limit the inventive concepts claimed herein.

Figure 1:
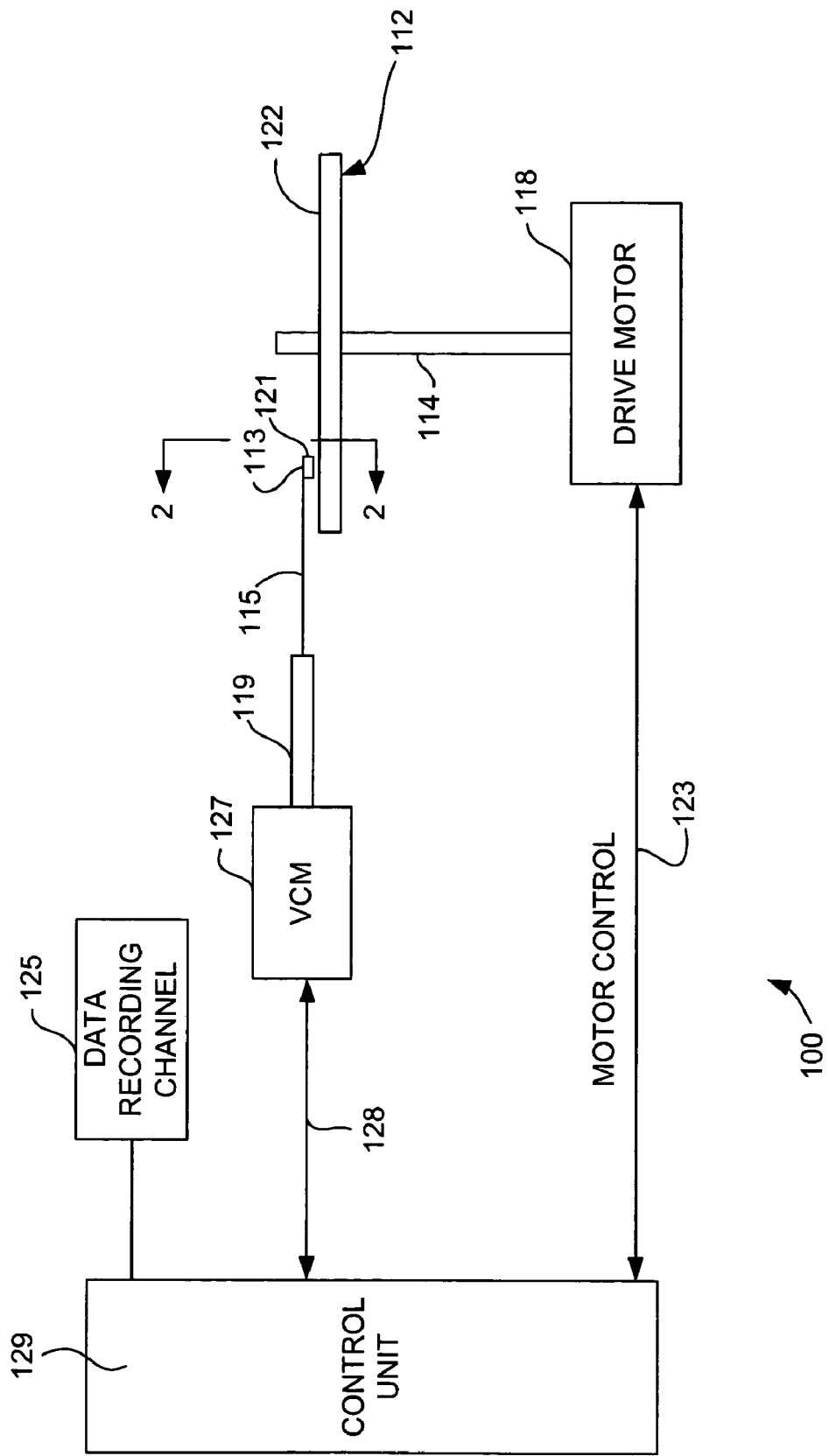
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
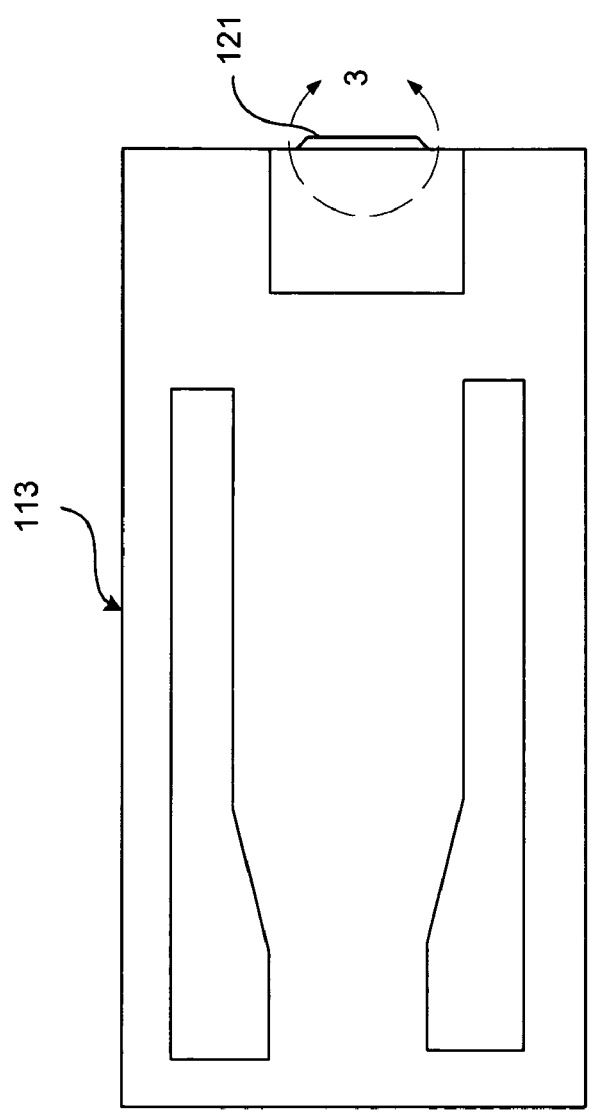
FIG. 2 is an ABS view of a slider illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
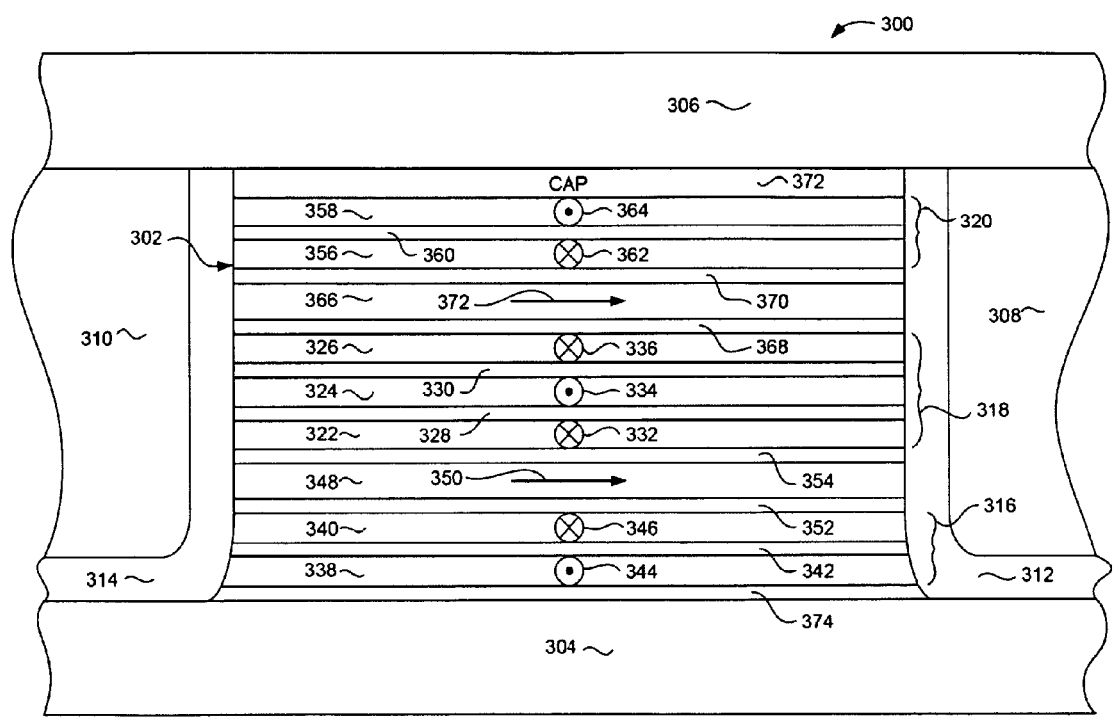
FIG. 3 is an ABS view of a magnetic sensor according to an embodiment of the present invention taken from circle 3 of FIG. 2, shown enlarged and rotated 90 degrees counterclockwise.

With reference now to FIG. 3, the magnetic head 121 (FIG. 2) includes a current perpendicular to plane (CPP) giant magnetoresistive (GMR) sensor 300 (shown in an ABS view) having a sensor stack 302 sandwiched between first and second magnetic shields 304, 306 that serve as electrically conductive leads for conducting a sense current to the sensor stack 302. The first and second leads 304, 306 can be constructed of many electrically conductive, magnetic materials such as for example NiFe.

The sensor 300 also includes first and second hard bias layers 308, 310 that extend laterally outward from the sides of the sensor stack 302 and first and second insulation layers 312, 314 that separate each of the hard bias layers 308, 310 from the sensor stack 302 and at least one of the shields 304 or 308. The hard bias layers 308, 310 are constructed of a hard magnetic material such as, for example, CoPtCr or some other material having a high magnetic coercivity. The insulation layers 312, 314 are constructed of a non-magnetic, electrically insulating material such as alumina ($Al_2O_3$).

With continued reference to FIG. 3, the sensor stack includes first, second and third pinned layer structures 316, 318, 320, the second pinned layer structure being located between the first and third pinned layer structures 316, 320. The second pinned layer structure 318, is a tri-layer structure, having first, second and third magnetic layers 322, 324, 326 respectively. The first and third magnetic layers 322, 326 can each have a thickness of 10 to 20 Å or about 15 Å. The second magnetic layer 324 can have a thickness of 25 to 35 Å or about 30 Å. The magnetic thicknesses of the first and third magnetic layers 322, 326 should be about equal to the magnetic thickness of the second magnetic layer 324 formed therebetween. Magnetic thickness will be understood by those skilled in the art to be the physical thickness of a layer multiplied by the magnetic moment of the material. The first and second magnetic layers 322, 324 are separated from one another by a first AP coupling layer 328, which can be for example Ru. Similarly, the second and third magnetic layers 324, 326 are separated from one another by a second AP coupling layer 330 which also could be constructed of Ru.

The first, second and third magnetic layers 322, 324, 326 of the second pinned layer structure 318 are antiparallel coupled across the first and second AP coupling layers 328, 330, so that the magnetic layers 322, 324, 326 have magnetic moments 332, 334, 336 that are pinned in directions perpendicular to the ABS as indicated. As can be seen with reference to FIG. 3, the magnetic moments 332, 336 of the first and third magnetic layers 322, 326 are parallel to one another, while the second (central) magnetic layer 324 has its magnetic moment 334 oriented antiparallel to the magnetic moments 332, 336 of the adjacent magnetic layers 322, 326.

The magnetic layers 322, 324, 326, are constructed of a magnetic material having a strong positive magnetostriction, which when placed under a compressive stress, such as is inevitably present in such sensors, causes the layers 322, 324, 326 to have a strong magnetic anisotropy in a direction perpendicular to the ABS, as desired. This strong magnetic anisotropy, in combination with the antiparallel coupling of the layers 322, 324, 326 pins the magnetic moments 332, 334, 336 of the layers 322, 324, 326, without the need for an AFM layer.

With continued reference to FIG. 3, the first pinned layer structure includes fourth and fifth magnetic layers 338, 340, which are antiparallel coupled across a third AP coupling layer 342, which can be Ru or some other suitable material. The fourth and fifth magnetic layers 338, 340 can each have a thickness of 25 to 35 Å or about 30 Å. The magnetic layers 338, 340 have magnetic moments that are pinned in antiparallel directions 344, 346, with the moment 346 of the fifth magnetic layer 340 being pinned in a direction parallel to that of the first magnetic layer 332 of the second pinned layer structure. It is important that the moments 346, 332 be parallel in order for the GMR contributions of these layers to be additive. The first pinned layer structure 316 can be either self pinned or AFM pinned and is preferably self pinned. If the first pinned layer 316 is self pinned, then the magnetic layers 338, 340 are preferably constructed of a material having a strong positive magnetostriction. Such a suitable material could be for example CoFe. Alternatively, if the first pinned layer structure were to be AFM pinned, then it could be pinned by exchange coupling the fourth magnetic layer 338 with a layer of AFM material (not shown) which would be located between the first pinned layer structure 316 and the first shield 304.

With reference still to FIG. 3, a first free layer 348 is disposed between the first and second pinned layers structures. The first free layer 348 can be constructed of various magnetic materials or combinations of such materials which can include for example, Co, CoFe, and NiFe and can have a thickness of 15 to 30 Å. The first free layer 348 has a magnetic moment 350. Although the magnetic moment 350 is free to rotate in response to a magnetic field, it is biased in a direction parallel with the ABS as indicated. Biasing of the magnetic moment 350 is provided by magnetostatic coupling with the hard bias layers 308, 310, as will be familiar to those skilled in the art.

The free layer 348 is separated from the first pinned layer structure 316 by a first spacer layer 352, and is separated from the second pinned layer structure 318 by a second spacer layer 354. The first and second spacer layers 352, 354 can be constructed of several non-magnetic, electrically conductive materials and are preferably constructed of Cu. The first and second spacer layers 352, 354 can each have at thickness of 15 to 25 Å or about 20 Å.

With continued reference to FIG. 3, the third pinned layer structure includes sixth and seventh magnetic layers 356, 358 that are antiparallel coupled across a fourth AP coupling layer 360. The sixth and seventh magnetic layers 356, 358 have magnetic moments that are pinned antiparallel to one another as indicated by symbols 362, 364. The moment 362 of the sixth magnetic layer 356 (that which is closest to the second pinned layer structure) has a its moment directed parallel to the moment of the outer magnetic layers 322, 326 of the second pinned layer structure 318. This is important to ensure that the GMR effects of the second and third pinned layer structures 318, 320 are additive rather than subtractive. As with the first pinned layer structure, the third pinned layer structure can be either self pinned or AFM pinned. If it is self pinned, then the magnetic layers 356, 358 should be constructed of a material having a positive magnetostriction such as CoFe. If the third pinned layer structure 320 is to be AFM pinned, then a layer of antiferromangetic material (not shown) would be disposed adjacent to the seventh magnetic layer 358. The sixth and seventh magnetic layers can be formed to have a thickness of 30 Å each or 25 to 35 Å each.

A second free layer 366 is disposed between the second and third pinned layer structures 318, 320. The second free layer 366 is separated from the second pinned layer structure by a third electrically conductive, non-magnetic spacer layer 368, and is separated from the third pinned layer structure 320 by a fourth electrically conductive, non-magnetic spacer layer 370. The second free layer 366 one or more magnetic materials which may include, Co, NiFe, or CoFe, and can be about 15 to 30 Å thick. The third and fourth spacer layers 368, 370 can be constructed of several non-magnetic, electrically conductive materials, and are preferably constructed of Cu. The sixth and seventh magnetic layers can each be 15 to 25 Å thick or about 20 Å thick. The second free layer 366 has a magnetic moment 372 at the top of the sensor stack 302 between the second pinned layer structure 318 and the second shield 306.

A capping layer 372 can be provided at the top of the sensor stack 302 between the third pinned layer structure 320 and the second shield 306. The capping layer 372 protects the sensor stack from corrosion and other damage during manufacture and can be constructed of for example Ru or Ta having a thickness of 35 to 45 Å.

In addition, a seed layer 374 may be provided at the bottom of the sensor stack 302 between the first pinned layer structure 316 and the first shield 304. The seed layer can be constructed of, for example, Ta/NiFeCr having a thickness of about 30 Å, Ta/NiFeCr/NiFe/PtMn having a thickness of about 20 Å, IrMnCr having a thickness of about 20 Å or some other material having a desired crystallographic structure. The seed layer improves GMR performance by promoting a desired epitaxial growth of the subsequently deposited layers of the sensor stack 302.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A current perpendicular to plane (CPP) giant magnetoresistive (GMR) sensor, comprising:
    a first pinned layer structure;
    a second pinned layer structure;
    a third pinned layer structure, the second pinned layer structure being disposed between the first and third pinned layer structures;
    a first free layer structure disposed between the first and second pinned layer structures;
    a second free layer disposed between the second and third pinned layer structures;
    a first non-magnetic, electrically conductive spacer layer separating the first pinned layer structure from the first free layer structure;
    a second non-magnetic, electrically conductive spacer layer separating the first free layer structure from the second pinned layer structure;
    a third non-magnetic, electrically conductive spacer layer separating the second pinned layer structure from the second free layer; and
    a fourth non-magnetic spacer layer separating the second free layer from the third pinned layer structure;
    the second pinned layer structure consisting of:
        a first magnetic layer
        a second magnetic layer;
        a third magnetic layer;
        a first non-magnetic antiparallel coupling layer disposed between the first and second magnetic layers; and
        a second non-magnetic antiparallel coupling layer disposed between the second and third magnetic layers.

2. A CPP GMR sensor as in claim 1, wherein the second pinned layer structure is a self pinned structure having magnetic moments that are pinned without exchange coupling with an antiferromagnetic material.

3. A CPP GMR sensor as in claim 1, wherein the second pinned layer structure is self pinned having magnetic moments in the first second and third magnetic layers that are pinned by magnetic anisotropy provided by magnetostrictive properties of the first, second and third magnetic layers in combination with compressive stresses in the sensor.

4. A CPP GMR sensor as in claim 1, wherein at least one of the first, second and third magnetic layers of the second pinned layer structure comprise CoFe.

5. A CPP GMR sensor as in claim 1, wherein the first, second and third magnetic layers of the second pinned layer structure comprise CoFe.

6. A CPP GMR sensor as in claim 1, wherein the first and third magnetic layers have magnetic thicknesses that when added together are substantially equal to the magnetic thickness of the second magnetic layer.

7. A CPP GMR sensor as in claim 1, wherein first and third magnetic layers have magnetic moments that are parallel to one another and that are antiparallel to a magnetic moment of the second magnetic layer.

8. A CPP GMR sensor as in claim 1, wherein the first and third magnetic layers are about 15 Å thick and the second magnetic layer is about 30 Å thick.

9. A CPP GMR sensor as in claim 1, wherein the first and third magnetic layers each have a thickness of 10 to 20 Å and the second magnetic layer has a thickness of 25 to 35 Å.

10. A CPP GMR sensor as in claim 1, wherein the first and second coupling layers each comprise Ru.

11. A CPP GMR sensor as in claim 1, wherein:
    the first pinned layer structure comprises fourth and fifth magnetic layers separated by a third non-magnetic coupling layer;
    the fifth magnetic layer is located adjacent to the first non-magnetic spacer layer;
    the fourth and fifth magnetic layer have magnetic moments that are antiparallel with one another; and the magnetic moment of the fifth magnetic layer is parallel with a magnetic moment of the first and third magnetic layers of the second pinned layer structure.

12. A CPP GMR sensor as in claim 11, wherein:
the third pinned layer structure comprises sixth and seventh magnetic layers separated by a fourth non-magnetic coupling layer;
the sixth magnetic layer is located adjacent to the fourth non-magnetic spacer layer;
the sixth and seventh magnetic layer have magnetic moments that are antiparallel with one another; and
the magnetic moment of the sixth magnetic layer is parallel with a magnetic moment of the first and third magnetic layers of the second pinned layer structure and the fifth magnetic layer of the first pinned layer structure.

13. A CPP GMR sensor as in claim 12, wherein the fourth, fifth, sixth and seventh magnetic layers comprise CoFe.

14. A CPP GMR sensor as in claim 12, wherein the third and fourth coupling layers comprise Ru.

15. A magnetoresistive sensor as in claim 1, wherein the first and third pinned layer structures are self pinned, without the use of an AFM layer.

16. A magnetoresistive sensor as in claim 1, further comprising:
a first layer of antiferromagnetic material AFM exchange coupled with at least a portion of the first pinned layer structure; and
a second layer of antiferromagnetic material AFM exchange coupled with at least a portion of the third pinned layer structure.

17. A GPP GMR sensor as in claim 1, wherein:
one of said first and third pinned layer structures is self pinned; and
the other of said first and third pinned layer structures is pinned by exchange coupling with an antiferromagnetic (AFM) material.

18. A CPP GMR sensor as in claim 1, further comprising a seed layer disposed beneath the first pinned layer structure, the seed layer comprising Ta/NiFeCr/NiFe/PtMn.

19. A GPP GMR sensor as in claim 1, further comprising a seed layer disposed beneath the first pinned layer structure, the seed layer comprising IrMnCr.

20. A magnetic data recording system, comprising:
a magnetic medium;
an actuator;
a slider attached to the actuator for movement adjacent to the magnetic medium; and
a magnetic head, including a current perpendicular to plane (CPP) giant magnetoresistive (GMR) sensor, the sensor further comprising:
a first pinned layer structure;
a second pinned layer structure;
a third pinned layer structure, the second pinned layer structure being disposed between the first and third pinned layer structures;
a first free layer structure disposed between the first and second pinned layer structures;
a second free layer disposed between the second and third pinned layer structures;
a first non-magnetic, electrically conductive spacer layer separating the first pinned layer structure from the first free layer structure;
a second non-magnetic, electrically conductive spacer layer separating the first free layer structure from the second pinned layer structure;
a third non-magnetic, electrically conductive spacer layer separating the second pinned layer structure from the second free layer; and
a fourth non-magnetic spacer layer separating the second free layer from the third pinned layer structure;
the second pinned layer structure consisting of:
a first magnetic layer
a second magnetic layer;
a third magnetic layer;
a first non-magnetic antiparallel coupling layer disposed between the first and second magnetic layers; and
a second non-magnetic antiparallel coupling layer disposed between the second and third magnetic layers.

* * * * *

UNITED STATES PATENT AND TRADEMARK OFFICE
CERTIFICATE OF CORRECTION

PATENT NO. : 7,511,926 B2 Page 1 of 1
APPLICATION NO. : 10/867521
DATED : March 31, 2009
INVENTOR(S) : Gill It is certified that error appears in the above-identified patent and that said Letters Patent is hereby corrected as shown below:

In claim 17, column 9, line 33, replace "A GPP GMR" with --A CPP GMR--.

In claim 19, column 10, line 1, replace "GPP" with --CPP--.

Signed and Sealed this

First Day of June, 2010

David J. Kappos
*Director of the United States Patent and Trademark Office*